United States Patent [19]

Genähr

[11] 4,418,335

[45] Nov. 29, 1983

[54] INFRARED INTRUSION DETECTOR WITH PYROELECTRIC SENSOR AND CHARGE AMPLIFIER

[75] Inventor: Rudolf Genähr, Männedorf, Switzerland

[73] Assignee: Cerberus AG, Männedorf, Switzerland

[21] Appl. No.: 303,630

[22] Filed: Sep. 18, 1981

[30] Foreign Application Priority Data

Oct. 6, 1980 [CH] Switzerland .................. 7441/80

[51] Int. Cl.³ ............................................ G08B 13/18
[52] U.S. Cl. .................................. 340/565; 250/340;
250/370; 340/600
[58] Field of Search ................... 340/565, 567, 600;
250/370, 340, 338

[56] References Cited

U.S. PATENT DOCUMENTS

| 3,703,718 | 11/1972 | Berman | 340/567 |
| 4,179,691 | 12/1979 | Keller | 340/565 |
| 4,341,012 | 7/1982 | Fripp et al. | 250/370 |

Primary Examiner—Glen R. Swann, III
Attorney, Agent, or Firm—Werner W. Kleeman

[57] ABSTRACT

An infrared intrusion detector, utilizing as a sensor element a pyroelectric detector element, accomplishes evaluation of the output signal of the detector element with a charge amplifier, for instance by means of a capacitive feedback coupled operational amplifier, the output signal of which is reset at certain time intervals. The evaluation circuit operates independently of the detector capacitance and therefore enables optimum utilization of the pyroelectrical properties. By virtue of the short-circuit operation and the low ohmic properties of the circuit there is obtained a particularly good non-sensitivity against external disturbances and low noise and increased sensitivity.

12 Claims, 3 Drawing Figures

INFRARED INTRUSION DETECTOR WITH PYROELECTRIC SENSOR AND CHARGE AMPLIFIER

BACKGROUND OF THE INVENTION

The present invention relates to a new and improved construction of an infrared intrusion detector which is of the type containing a pyroelectric detector element and an evaluation circuit connected therewith for giving an alarm signal in the presence of a change in radiation of the detector element caused by a moving object, typically an individual.

In the case of infrared intrusion detectors, such as for instance disclosed in U.S. Pat. No. 3,703,718, granted Nov. 21, 1972 or United States Pat. No. 4,058,726, granted Nov. 15, 1977, the infrared radiation emitted by a human at receiving regions or fields of view is received by a suitable detector element or detector. An evaluation circuit connected with this detector element, such as for instance disclosed in the aforementioned U.S. Pat. No. 3,703,718 or U.S. Pat. No. 4,179,691, granted Dec. 18, 1979, delivers an alarm signal as soon as the infrared radiation received by the detector element alters in a manner characteristic for the movement of a person at the monitored region.

Previously there was used as the detector element in such infrared intrusion detectors usually sensors which altered their electrical resistance when they were irradiated, or those which when impinged by infrared radiation delivered a voltage at their output, for instance bolometers, photoresistors or photoelements. The evaluation circuits connected therewith were provided at their input usually with a suitable amplifier element which, when working with high-ohm sensors, normally was designed as a field-effect transistor. In order to be able to detect changes in the radiation impingement a differentiation element usually was provided before or after the imput amplifier.

In more recent times pyroelectric detector elements have been found to be extremely suitable for use with infrared intrusion detectors. These pyroelectric detector elements also can be manufactured in a foil configuration and then can be particularly flexibly or universally adapted as concerns their dimensions and shape to the contemplated field of use and in the case of infrared intrusion detectors particularly to the desired receiving regions or fields of view.

Heretofore known pyroelectric detectors for instance those formed of single crystals, such as for example lithium tantalate, $LiTaO_3$, ceramics, for instance lead-zirconate-titanate, PZT, or lead-zirconate-iron-niobate or foils of polyvinyldifluoride ($PVF_2$) consist of a ferroelectric material, i.e. of a dielectric having a certain capacitance which is governed by the dimensions and thickness of the detector. When receiving infrared radiation the dielectric heats-up and there is formed an electrical potential by virtue of the generated charge. This electrical potential is dependent upon the pyroelectric coefficient of the material which indicates the amount of electrical charge which has been generated per unit area and per temperature change as well as upon the capacitance of the detector element, i.e. upon the dielectric constant of the material.

During the evaluation of such output voltage of the pyroelectric detector it is necessary to use an extremely high-ohm voltage amplifier having an input resistance of at least $10^{10}$ ohms because of the high internal resistance. Thus, as has been disclosed in British Pat. No. 2,021,761 published Dec. 5, 1979 or U.S. Pat. No. 3,839,640, granted Oct. 1, 1974, there is usually used for this purpose a field-effect transistor, the gate electrode of which is directly controlled by the pyroelectric detector. What is disadvantageous with this circuit arrangement is that because of the high-ohm removal of the voltage there occurs a large resistance or thermal noise at the amplifier input and the connection of the detector with the amplifier is extremely sensitive to stray capacitances and electrical disturbances.

Special screening measures and a special assembly of the amplifier element are therefore necessary. Additionally, the time-constant of the detector is relatively large and is in the order of a number of seconds, so that the value of the time-constants additionally is dependant upon the detector capacitance, i.e. upon the dimensions of the detector element, which in each instance requires a special accommodation or adaptation.

A further drawback of such evaluation circuits working with a high-ohm voltage amplifier resides in the fact that the signal voltage generated by a change in radiation also is dependant upon the capacitance of the detector element, in other words upon the dielectric constant of the material. By virtue of the foregoing during the fabrication of such detectors there is decisive, apart from thermal properties which can be influenced by the construction, not solely the pyroelectric coefficient, but also the dielectric constant. The particularly great pyroelectric coefficient of certain materials, for instance that of PZT therefore cannot be utilized, since at the same time the dielectric constant is extremely high and such detectors therefore deliver a smaller signal when using known evaluation circuits than detectors having poorer pyroelectric properties and smaller dielectric constants.

SUMMARY OF THE INVENTION

Therefore, with the foregoing in mind it is a primary object of the present invention to provide a new and improved construction of infrared intrusion detector containing a pyroelectric detector element which is not associated with aforementioned drawbacks and limitations of the prior art constructions.

Another and more specific object of the present invention aims at avoiding the aforementioned limitations and disadvantages of heretofore known infared intrusion detectors, and specifically devising an evaluation circuit for an intrusion detector containing a pyroelectric detector element which possesses a low noise level and an increased sensitivity, which is insensitive to disturbances and does not require any screening, which is independant of the capacitance of the detector element, and wherein, the pyroelectric properties of the material can be optimumly utilized and with improved efficiency.

Still a further significant object of the present invention concerns the provision of a new and improved construction of infared intrusion detector which is relatively simple in design, extremely economical to manufacture, highly efficient and reliable in operation, not readily subject to breakdown or malfunction and requires a minimum of maintenance and servicing.

Now in order to implement these and still further objects of the invention, which will become more readily apparent as the description proceeds, the infrared intrustion detector of the present development is manifested by the features that the evaluation circuit comprises a charge amplifier, the input of which is connected with the output of the detector element. Advantageously, this charge or charging amplifier is provided at its input with an operational amplifier, the output of which is feedback coupled by means of a capacitor with its control input. Since the feedback capacitor can charge by means of leakage currents, a further aspect of the invention contemplates the provision of a resetting device which periodically short-circuits and discharges the feedback capacitor.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
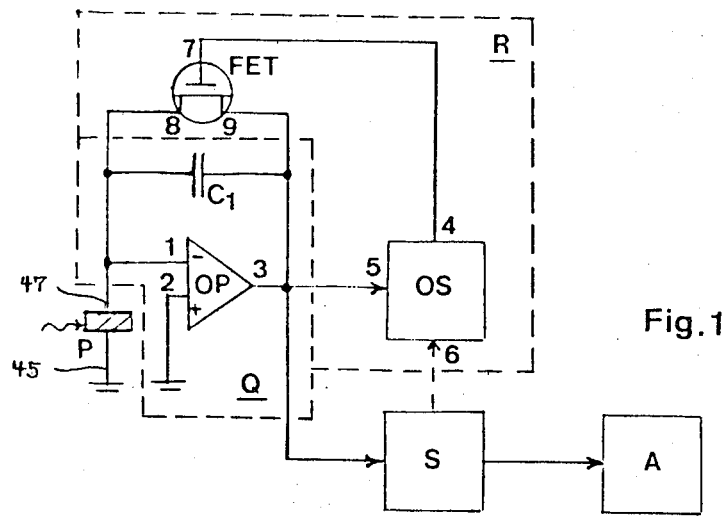
FIG. 1 is a block circuit diagram of an infrared intrusion detector according to the invention.

Describing now the drawings, it is to be understood that only enough of the construction of the infrared intrusion detector has been shown as needed to enable those skilled in the art to readily understand the underlying principles and concepts of the present development. Turning attention now to FIG. 1, reference character P designates a sensor element of an infrared intrusion detector, the mechanical and optical construction of which can be carried out, for instance, in the manner disclosed in the previously mentioned U.S. Pat. No. 4,058,726, the disclosure of which is incorporated herein by reference. The sensor element P is fabricated from any one of the previously mentioned conventional pyroelectric materials, and in order to obtain an optimum efficiency preferably from a material having a particularly large pyroelectric coefficient, for instance PZT. One of the electrodes of the pyroelectric detector element P is grounded, as indicated by reference character 45, and the other electrode 47 is connected with the input of a charge or charging amplifier Q.

This charge amplifier Q contains an operational amplifier OP, for instance of the commercially available type CA 3 140 available from RCA, the first control or inverting input 1 of which is connected with the non-grounded electrode 47 of the pyroelectric detector element, this electrode 47 constituting the output of such pyroelectric element. The output 3 of the operational amplifier OP is feedback coupled by means of a capacitor $C_1$ with the control input 1. At the output 3 of the operational amplifier OP there is connected a signal evaluation circuit S which controls an alarm circuit A as soon as the output signal of the operational amplifier OP fulfils certain predetermined criteria.

Having now explained the foregoing circuit its mode of operation will be considered and is as follows:

The pyroelectric detector element P produces a polarisation change by virtue of the polar build-up of the ferroelectric material, and thus, a surface charge as soon as there occurs a temperature change because of irradiation of such detector element P. Since this surface charge is compensated within a relatively short time due to the measuring operation or due to free charges emanating from the air, the self-regulating or self-adjusting surface charge is approximately proportional to the irradiation change. A differentiation element, as is needed with heretofore known infrared intrusion detectors, can be dispensed with when using a pyroelectric detector element.

The charge appearing at the pyroelectric detector element P now is evaluated by means of the charge amplifier Q instead of by using a voltage amplifier, for instance as illustrated in the exemplary embodiment by means of the capacitive feedback coupled operational amplifier OP. Since the gain of such operational amplifier is exceptionally great, as a general rule above 10,000, the output voltage of the operational amplifier OP only is dependant upon the charge formed at the detector element P and upon the feedback capacitor or capacitance $C_1$. On the other hand, the capacitance of the detector element P does not appear in the output signal. The particularly great pyroelectric coefficient of the selected material can be completely and optimumly utilized, i.e. the radiation sensitivity of an intrusion detector equipped with such evaluation circuit is appreciably improved.

Since the detector element P is practically operated in a short-circuit mode the connection of the detector with the amplifier is extremely low-ohmic, and thus, insensitive to electrical disturbances or spurious signals. Also stray capacitances are not introduced into the measurement result. The pre-amplifier therefore need not be specially screened or installed. Because of the short-circuit mode of operation there also does not appear any thermal or resistance noise at the amplifier input, and the electrical time-constant of the detector is extremely small. Since the evaluation circuit also operates extremely rapidly it is possible to relatively freely select in the signal evaluation lower and upper thresholds for the permissible speed of movement of an individual. Because the amplifier output is low-ohmic it is additionally possible to particularly well process the output voltage.

The charge amplifier Q practically constitutes an integrating amplifier. At the feedback capacitor $C_1$ there appears the time-wise integrated short-circuit current of the detector element P as the capacitor charge. Since this capacitor C, therefore also can charge by means of leakage currents over a longer period of time, it is advantageous to periodically place such capacitor at null potential. To this end there is provided a resetting device R which discharges the capacitor $C_1$ at certain times. This resetting device R for instance can comprise a pulse generator or clock generator OS, the output 4 of which controls the gate electrode 7 of a field-effect transistor FET constituting a switching element, the source-drain path 8, 9 of which is connected in parallel with the feedback capacitor $C_1$.

The pulse generator or clock generator OS can be structured such that it periodically delivers at its output 4, at predetermined time intervals, a pulse which briefly renders conductive the field-effect transistor FET, so that the feedback capacitor $C_1$ can discharge through the field-effect transistor FET. According to a further advantageous design of the invention the pulse generator OS or equivalent structure however also can be controlled by the output 3 of the operational amplifier OP or also by the signal evaluation circuit S by means of the corresponding inputs 5 and 6, respectively. Resetting of the signal of the feedback capacitor $C_1$ therefore can be accomplished as a function of the output voltage or a further processed signal thereof. Here it is further mentioned that it is also of advantage that in this manner it is possible to eliminate voltage peaks.

Figure 2:
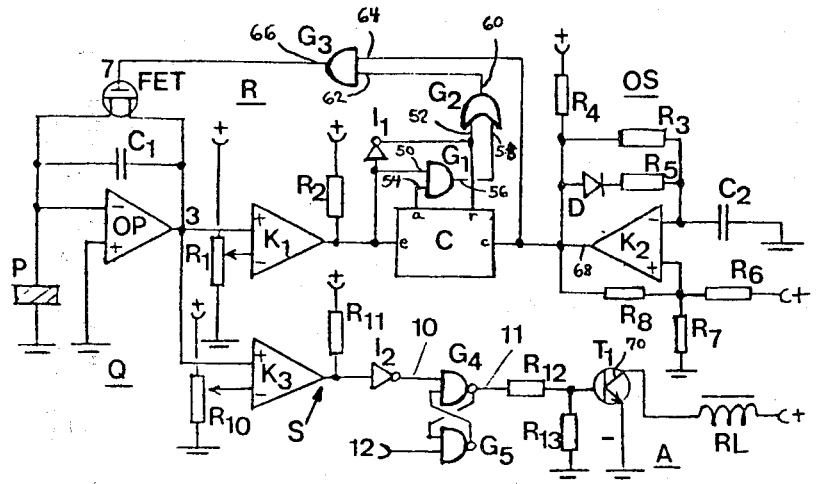
FIG. 2 is a detail circuit diagram of the intrusion detector of FIG. 1.

Turning attention now to FIG. 2 there is shown in detail the construction of the elements of an evaluation circuit which has been further designed in this manner. The output 3 of the operational amplifier OP is connected with the non-inverting input of a comparator $K_1$ which, for instance, can be a part of a four fold-comparator which is commercially available from Motorola Corporation under its commercial designation Type MM 74 C 909. The inverting input is connected with the tap of a potentiometer $R_1$ which is at a potential between ground and a positive potential, for instance +12 Volts, and the output of which is connected with a counter C, for instance of the commercially available Type CD 4 518, as well as with a resistance $R_2$ having a value of several kohms. Also the output of the comparator $K_1$ is connected with one input 50 of an AND-gate $G_1$ and by means of an inverter $I_1$ with one input 52 of an OR-gate $G_2$, which additionally is connected with the resetting input r of the counter C. The output a of the counter C is connected with the other input 54 of the AND-gate $G_1$, the output 56 of which is connected with the other input 58 of the OR-gate $G_2$. The output 60 of this OR-gate $G_2$ is connected with the input 62 of a further AND-gate $G_3$, the other input 64 of which is controlled by the oscillator OS and the output 66 of which is connected with the gate electrode 7 of the field-effect transistor FET.

The oscillator OS consists of a further comparator $K_2$, for instance a further part of the four fold-comparator MM 74 C 909 of Motorola Corporation. The inverting input of the comparator $K_2$ is held at a positive potential by means of the resistance $R_3$ of several megohms and the resistance $R_4$ of several kohms, wherein the resistance $R_3$ is shunted by the series circuit of the resistance $R_5$ of several kohms and a diode D, and the tap or junction of the series circuit of the resistances or resistors $R_3$ and $R_4$ is connected with the output 68 of the comparator $K_2$, so that there is formed a feedback circuit or loop. Additionally, the inverting input of the comparator $K_2$ is connected to ground by means of a capacitor $C_2$ having a capacitance in the nF-range. The non-inverting input of the comparator $K_2$ is connected by means of three resistances $R_6$, $R_7$ and $R_8$ in the megohm range with the positive potential or voltage, with ground and with the comparator output, respectively. The entire circuit forms an oscillator which periodically delivers briefly lasting pulses to the input 64 of the AND-gate $G_3$.

As long as the output voltage of the operational amplifier OP is smaller than the threshold voltage of the comparator $K_1$ its output voltage remains at null. Consequently, by means of the inverter $I_1$ and the OR-gate $G_2$ there is prepared the AND-gate $G_3$ so that the pulses of the oscillator OS can pass. At the same time the counter C is maintained by means of the resetting input r at null, i.e. all of the counter outputs have appearing thereat the signal null. If, however, the output voltage of the operational amplifier OP ascends beyond the threshold of the comparator $K_1$ then the latter delivers an output signal and the AND-gate $G_3$ is blocked by means of the inverter $I_1$ and the OR-gate $G_2$. At the same time there disappears the reset signal at the resetting input r of the counter C and such is released by means of the preparatory input e connected with the comparator $K_1$, so that now there is counted by means of the counter input c the pulses of the oscillator OS which, however, because of the blocked AND-gate $G_3$ cannot discharge the capacitor $C_1$ of the charge amplifier Q. Once there has been attained a certain predetermined number of counting pulses, for instance 2, 4, 8, 16 or 64 pulses, then there appears at the output a of the counter C a signal by means of which, through the action of the AND-gate $G_1$ and the OR-gate $G_2$, there is again prepared the AND-gate $G_3$, so that the pulses of the oscillator OS can again periodically discharge the charge amplifier Q. The same occurs when the output signal of the operational amplifier OP again becomes smaller than the threshold voltage or potential of the comparator $K_1$.

The signal evaluation circuit S which is connected with the output 3 of the operational amplifier OP possesses a third comparator $K_3$, for instance a further part of the four fold-comparator MM 74 C 909 of Motorola Corporation, the non-inverting input of which is connected with the output 3 of the operational amplifier OP and the inverting input of which is connected with the tap of a further potentiometer $R_{10}$ which is at a potential between ground and positive voltage. The output of the comparator $K_3$ is connected by means of a resistance $R_{11}$ of several kohms with the positive potential or voltage and is coupled by means of a further inverter $I_2$ with the alarm circuit A. This alarm circuit A contains at the input 10 a flip-flop circuit composed of two crosswise feedback coupled NAND-gates $G_4$, $G_5$. At the output 11 there remains an output signal even when there disappears the signal at the input 10, as long as it is not reset by a pulse at the resetting input 12. This output signal is inputted by means of a resistance $R_{12}$ in the kohm range to the base of a transistor $T_1$ having a base resistance $R_{13}$, and at the collector 70 of which there is connected an alarm relay RL.

Modifications of this circuit are of course possible and well within the teachings and scope of the invention and will be readily apparent and suggest themselves to those skilled in this and the electronics arts.

Figure 3:
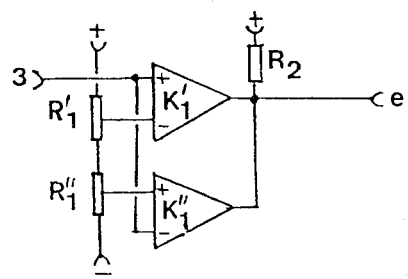
FIG. 3 is a circuit diagram of a window comparator.

FIG. 3 shows by way of example a window comparator or discriminator which can replace the comparator $K_1$ of FIG. 2. Instead of using a single comparator there are connected at the output 3 of the operational amplifier OP two comparators $K_1'$ and $K_1''$, the first by means of its non-inverting input and the second with its inverting input. The other inputs, i.e. the inverting input of the first comparator $K_1'$ and the non-inverting input of the second comparator $K_1''$ are each connected with the tap of a respective potentiometer $R_1'$ and $R_1''$, which are at a potential between the positive and negative voltage. The output of both comparators $K_1'$ and $K_1''$ is again connected with the control input e of the counter C. The advantage of this circuit configuration resides in the fact that both in the case of positive and also negative deviations from the normal value, i.e. both upon exceeding an upper threshold as well as upon falling below a lower threshold, there is triggered a signal. Such circuit enables not only detecting an object which is warmer in relation to the surroundings or ambient conditions, but also the movement of a colder object in front of a warmer background.

While there are shown and described present preferred embodiments of the invention, it is to be distinctly understood that the invention is not limited thereto, but may be otherwise variously embodied and practiced within the scope of the following claims. Accordingly,

What I claim is:

1. An infrared intrusion detector comprising:
   a pyroelectric detector element;
   an evaluation circuit serving for giving an alarm signal in the event of a change in radiation of the detector element caused by a moving object;
   said evaluation circuit being operatively connected with said pyroelectric detector element;
   said evaluation circuit containing a charge amplifier;
   said detector element having an output;
   said charge amplifier having an input; and the input of the charge amplifier being connected with the output of the detector element.

2. The infrared intrusion detector as defined in claim 1, wherein:
   said charge amplifier comprises an operational amplifier;
   said operational amplifier having an output and an input which is controlled by the detector element; and
   the output of the operational amplifier being feedback coupled by means of a capacitor with its input controlled by the detector element.

3. The infrared intrusion detector as defined in claim 1, further including:
   a resetting device provided for the evaluation circuit for resetting, in accordance with certain time intervals, the output voltage of the charge amplifier.

4. The infrared intrusion detector as defined in claim 2, further including:
   a resetting device provided for the evaluation circuit for resetting, in accordance with certain time intervals, the output voltage of the charge amplifier.

5. The infrared intrusion detector as defined in claim 2, further including:
   a resetting device provided for the evaluation circuit;
   said resetting device comprising a pulse transmitter and an electronic switching element controlled by the pulse transmitter in order to place the electronic switching element into a conductive state;
   the operational amplifier having a control input; and
   the switching element bridging said output and said control input of the operational amplifier.

6. The detector as defined in claim 5, wherein:
   said pulse transmitter is structured to deliver pulses at predetermined time intervals.

7. The infrared intrusion detector as defined in claim 5, wherein:
   said resetting device is controlled by the the output of the operational amplifier such that there is accomplished delivery of pulses as a function of the output voltage of the operational amplifier.

8. The infrared intrusion detector as defined in claim 7, further including:
   means provided for the resetting device for suppressing a predetermined number of pulses as long the output voltage of the charge amplifier exceeds an adjustable threshold value.

9. The infrared intrusion detector as defined in claim 7, further including:
   a comparator connected with the output of the operational amplifier; and
   said comparator delivering an output signal when its input signal exceeds a predetermined threshold.

10. The infrared intrusion detector as defined in claim 8, further including:
    a comparator connected with the output of the operational amplifier; and
    said comparator delivering an output signal when its input signal exceeds a predetermined threshold.

11. The infrared intrusion detector as defined in claim 9 or 10, further including:
    an AND-gate having a first input and a second input;
    the output of the comparator controlling the switching element by means of the first input of said AND-gate;
    the second input of said AND-gate being controlled by the pulse transmitter;
    a counter for counting the pulses of the pulse transmitter;
    the output of the comparator being connected with the counter; and
    the output pulses of the counter controlling the first input of the AND-gate after a predetermined number of input pulses with simultaneous presence of an output signal of the operational amplifier.

12. The infrared intrusion detector as defined in claim 9 or 10, wherein:
    said comparator comprises a window comparator which delivers an output signal when its input signal falls below a predetermined different threshold.

* * * * *